United States Patent
Ackermann et al.

(10) Patent No.: US 7,893,661 B2
(45) Date of Patent: Feb. 22, 2011

(54) DRIVER CIRCUIT ARRANGEMENT

(75) Inventors: Bernd Ackermann, Aachen (DE);
Henricus Petronella Maria Derckx, Eindhoven (NL); Wilhemus Johannes Robertus Van Lier, Heerlen (NL); Eberhard Waffenschmidt, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 525 days.

(21) Appl. No.: 12/089,236

(22) PCT Filed: Oct. 2, 2006

(86) PCT No.: PCT/IB2006/053581

§ 371 (c)(1),
(2), (4) Date: Apr. 4, 2008

(87) PCT Pub. No.: WO2007/039862

PCT Pub. Date: Apr. 12, 2007

(65) Prior Publication Data

US 2008/0272743 A1 Nov. 6, 2008

(30) Foreign Application Priority Data

Oct. 5, 2005 (EP) .................... 05109219

(51) Int. Cl.
*H01M 10/46* (2006.01)
(52) U.S. Cl. ........................................ 320/166
(58) Field of Classification Search .......... 320/107, 320/112, 114, 116, 128, 166, 167
See application file for complete search history.

(56) References Cited

U.S. PATENT DOCUMENTS

| 5,936,599 | A | 8/1999 | Reymond |
| 6,452,814 | B1 | 9/2002 | Wittenbreder |
| 6,618,031 | B1 | 9/2003 | Bohn et al. |
| 2003/0142513 | A1* | 7/2003 | Vinciarelli ............... 363/17 |
| 2004/0066154 | A1 | 4/2004 | Ito et al. |
| 2004/0170036 | A1 | 9/2004 | Iwahori |
| 2005/0178632 | A1* | 8/2005 | Ross ..................... 191/10 |

FOREIGN PATENT DOCUMENTS

DE 4022166 A1 1/1992

* cited by examiner

*Primary Examiner*—Edward Tso

(57) ABSTRACT

The invention relates to a driver circuit arrangement (1') for driving a plurality of individually switchable electrical subsystems (A', B', C'), such as (arrangements of) LEDs (9-A, 9-B, 9-C). Each subsystem has at least one energy storage device (10-A, 10-B, 10-C), such that when the subsystem is disconnected from the main source (7) of electrical energy, the energy storage device can supply energy to the device(s) of the subsystem. By furthermore providing at least one sub-switch (13-A, 13-B, 13-C) in the subsystem, between the energy storage device and an electrical device of the subsystem, control over the device is still possible when the subsystem is disconnected form the main source of electrical energy.

8 Claims, 1 Drawing Sheet

DRIVER CIRCUIT ARRANGEMENT

FIELD OF THE INVENTION

The invention relates to a driver circuit arrangement. In particular, the invention relates to a driver circuit arrangement, comprising a connection to a source of electrical energy, and a plurality of individually switchable electrical subsystems, each subsystem comprising a switch for controlling a flow of energy from the source of electrical energy to said subsystem, an electrical device, and an energy storage device for storing energy.

BACKGROUND OF THE INVENTION

In many electrical appliances, use is made of more than one electrical device. Such electrical devices may e.g. be connected in series, in parallel or in combinations thereof.

A number of design constraints have to be taken into account when designing circuit arrangements with a plurality of electrical devices. For example, driving a group of electrical devices connected in series, gives problems with respect to the high side driving because this may result in the total voltage being so large that it is e.g. in conflict with safety regulations. When the electrical devices are connected in parallel, driving the devices time-sequentially severely limits the duty cycle for each device, and thus also the total efficiency. To overcome this latter problem, the prior art proposed to include e.g. a capacitor in the circuit, in order to be able to drive the devices in periods during the time-sequentially driving of the devices in which no main energy is provided. For example, document US-2004/0066154 A1 discloses a lighting circuit for lighting a vehicular lamp that includes a plurality of light-emitting diodes (LEDs). The lighting circuit includes an output voltage regulator, a light source selecting unit and an output controlling unit. Furthermore, each LED or group of LEDs has a capacitor connected in parallel that is charged during a period in which the light source is selected. During a period in which the light source is not selected, the capacitor supplies a current to the light source.

A problem of the known circuit is that control over the energy flow to the devices, and thus over the circuit as a whole, is lost in the OFF-period of the time-sequential driving. In many cases, this is undesirable, since this limits the control over the performance of the total device. For example, in the case of the vehicular lamp of US 2004/0066154 A1, control over the brightness of the individual LEDs is lost.

SUMMARY OF THE INVENTION

It is an object of the invention to provide a driver circuit arrangement with an improved control over the electrical devices and the energy flow there through.

This object is achieved with a driver circuit arrangement of the type mentioned above, wherein each subsystem comprises a subswitch, constructed and arranged to control a flow of stored energy from the energy storage device to the electrical device. By including a subswitch in each subsystem, it is still possible to control the flow of energy, in this case stored energy, to the electrical device even when the main flow of energy, from the source of electrical energy to said subsystem, is in an OFF-phase. Of course, there is also control over the device when said main flow of energy is in an ON-phase. In other words, full control over the total energy flow to the electrical device is maintained during all the time.

In a preferred embodiment, the driver circuit arrangement further comprises a power converter. In this embodiment, the circuit arrangement thus comprises a converter for driving the subsystems. In many cases, there will be only one power converter, or a small number of power converters, in order to have a small component count in the driver circuit arrangement. Having a low number of power converters has a relatively large influence on said component count, or at least on the complexity and costs of the total circuit arrangement. Examples of power converters are buck converters and boost converters, both of which are known in the art per se.

In addition to one or more power converters, it is also possible to include a power source in the circuit arrangement. An example could be a battery, such as is used in motor vehicles or the like.

In a special embodiment, the driver circuit arrangement further comprises a switch controller for controlling the switches. Although in principle it is sufficient if the driver circuit arrangement has an electrical connection for such a switch controller, the inclusion of a switch controller in the driver circuit arrangement is advantageous in that it allows for optimum connectivity and reliability of the driver circuit arrangement as a whole. Such a switch controller may comprise any known type of switch controller, in particular various types of transistor based switch controllers, although other types are not excluded. In particular, the switch controller establishes time-sequential driving of the various subsystems. This may comprise simple subsequent switching between the various subsystems according to a clock frequency, i.e. in a regular fashion. In particular, it relates to time-sequential driving with a pulse width manipulation (PWM), or corresponding types of driving each subsystem with its own specific power demand.

In a particular embodiment, the driver circuit arrangement further comprises a subswitch controller for controlling the subswitches. Again, although it would suffice to provide an electrical connection to such a subswitch controller in the driver circuit arrangement, including a subswitch controller in the driver circuit arrangement may be advantageous for similar reasons as mentioned above for the switch controller. The subswitch controller may control the subswitches in a similar fashion as the switch controller controls the switches. I.e., the subswitch controller may switch the electrical device on and off according to a clock frequency or according to some external control instruction. In particular, such external control instruction may be based on a feedback signal that results e.g. from a measured effect of the electrical devices. This will be further elucidated below.

In a special embodiment, the energy storage device comprises a capacitor. Although the invention is not limited as to the type of energy storage device, the use of a simple device such as a capacitor offers advantages with respect to the relatively simple layout of the driver circuit arrangement. However, other energy storage devices, such as batteries, are not excluded.

In a special embodiment, at least one subsystem comprises a plurality of electrical devices connected in parallel and/or in series. The driver circuit arrangement of the present invention allows optimum control over the electrical devices even during times when those devices do not obtain energy from the main source of electrical energy. In this particular embodiment, more than one electrical device is present in a subsystem. This may be useful if driving that number of electrical devices in said subsystem is easily performed by the source of electrical energy and an optional power converter in the circuit arrangement. Examples are circuit arrangements with large numbers of electrical devices, that are grouped in a number of subsystems, such as light sources in lighting systems.

According to a particular embodiment, in at least one subsystem, each electrical device is individually switchable and individually energizable. Each electrical device being individually switchable and energizable means that, if the subsystem comprises N electrical devices, there are at least N separate switch conditions for the subswitch as well as for the energy storage device. This may be achieved by providing the subsystem with a separate subswitch for each electrical device, in other words with N subswitches and similarly by providing N separate energy storage devices. Alternatively or additionally, it is possible to make the subswitch able to select each of the electrical devices separately, e.g. time-sequentially, and also to select an energy flow from a single energy storage device to a selected electrical device. However, it is advantageous to provide each electrical device with its own subswitch and its own energy storage device, since this allows maximum freedom in control over each electrical device, and a maximum total duty cycle.

It is to be noted that, when some subsystem is being provided with energy from a main energy source, while other subsystems are provided with energy by their respective energy storage devices, control of the subswitches of said other subsystems allows control over the balance of the performance of said other subsystems not only with respect to said some subsystem, but also with respect to each other. This will be elucidated below.

In a special embodiment, at least one electrical device comprises a LED. In particular, substantially all electrical devices are LEDs. Although any electrical device may be used, such as lamps, sensors, etc., in particular LEDs are very useful in the driver circuit arrangement according to the present invention, since they not only occur very frequently in large groups, but it is also very important for lighting to be controlled to a very high degree. In particular, the color of some individual LEDs may be varied within certain boundaries. Furthermore, and more importantly, the light of various LEDs may be combined, in order to form other colors. This principle may be used for general illumination, LCD backlights, etc. Since the human eye is very sensitive to variations in the observed color of the light, optimum control is desirable in such applications. For example, light of three different colors (red, green, blue, RGB) may be combined to produce white light. When for each color a group of LEDs is used, the groups of LEDs for each color will often be driven time-sequentially. When, during the time period that for example the red and green LEDs are in an "OFF" state with respect to a main source of electrical energy, and thus obtain energy from their respective energy storage devices, and there is furthermore a variation in the light emission of the blue LEDs, for example due to a temperature change, a change in the main source of electrical energy etc., the emission of the red and greed LEDs may be adapted to maintain a certain total color by controlling the energy flow from the energy storage devices to the red and green LEDs by appropriate switching of the subswitches. Note that it is not only possible to adapt the red and green LEDs with respect to the blue LEDs, but it is also possible to adapt them with respect to each other. For example, even when the desired brightness and the power supply remains unchanged, it may be possible that the required hue of the total light is desired to change. In that case, it is possible to change the ratio of the brightness of the red LED with respect to the green LED by appropriately controlling their respective subswitches. Note that this control is absent in the case of the prior art devices without subswitches.

In case the emission of the blue LEDs would increase due to the variations, it would of course suffice to lower the power supplied to the blue LEDs. It is during a decrease of the emission of an electrical device that is powered by the (main) source of electrical energy, while other devices are supplied with energy from the energy storage device, in which the present invention offers particular advantages. It goes without saying that the above description also holds in case another type of LED is in the "ON" state, while others are in the "OFF" state with respect to the main source of electrical energy.

Note that other numbers of colors, such as the four-color RGBA system, are also possible. This may be advantageous for the color rendering, due to the relatively small bandwidth of LEDs. A general remark may here, is that organic LEDs (also called OLEDs) are deemed to be comprised in the expression LEDs, throughout this application. In other words, wherever the word LED(s) is used, one should include the use of OLED(s).

It is an important advantage of the present invention that the electrical devices may be driven individually and independently of each other, while still allowing a flow of energy during the OFF period of a time-sequential driving by a main source of energy.

BRIEF DESCRIPTION OF THE DRAWINGS

These and other aspects of the invention are apparent from and will be elucidated with reference to the embodiments described hereinafter.

In the drawings.

DETAILED DESCRIPTION OF THE PREFERRED EMBODIMENTS

Figure 1:
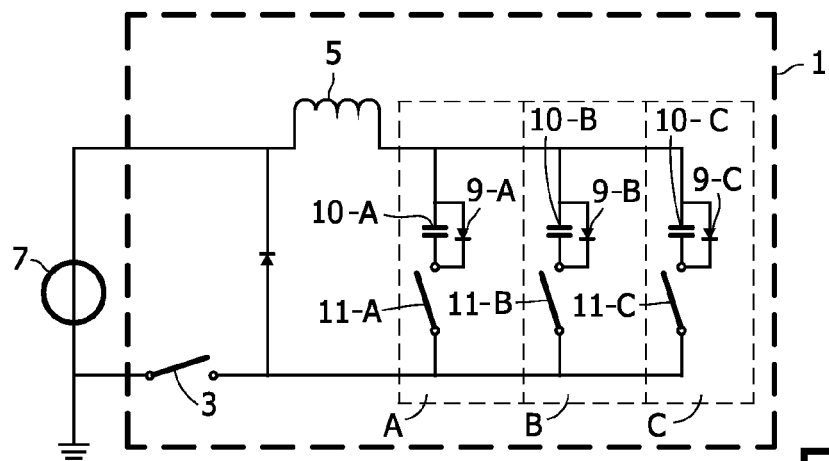
FIG. 1 shows a prior art driver circuit arrangement.

FIG. 1 shows a prior art driver circuit arrangement.

The driver circuit arrangement 1 comprises a connecting switch 3, which connects a power converter, schematically indicated by reference numeral 5, to an external source of energy 7. The arrangement 1 further comprises three subsystems A, B and C, each of which comprises an electrical device 9, an energy storage device 10 and a switch 11.

The prior art driver circuit arrangement as shown in FIG. 1 is connectable to a source of electrical energy 7, such as a voltage source, e.g. a battery.

As indicated, the circuit arrangement 1 comprises three subsystems A, B and C. Each subsystem A, B, C comprises an electrical device, an energy storage device and a switch. Taking a look at the first subsystem A, this would work as follows:

When some control unit (not indicated in the figure) selects subsystem A, this subsystem A could be supplied with electrical energy from the source 7, and switch 11-A will be in a closed position. If desired, switches 11-B and 11-C may be in an open position, although this is not necessary. The device 9-A will now be supplied with energy from the energy source 7, while also energy source device 10-A will be supplied with energy. The device 9-A may, in principle, be any desired electrical device, but is preferably a simple device such as an LED, including an organic LED, and so on. For the present embodiment, the devices are taken to be LEDs. The energy storage device 10-A may for example be a capacitor.

Subsequently, the control device (not shown) may deselect the first subsystem A, e.g. by opening the switch 11-A. In that case, the capacitor 10-A will start supplying the electrical device 9-A with electrical energy. In other words, the electrical device 9-A will be supplied with electrical energy even after disconnecting the device 9-A from the main source 7 of electrical energy. This reduces control over the functioning of the device 9-A. Similar considerations of course hold for the other subsystems B and C.

Figure 2:
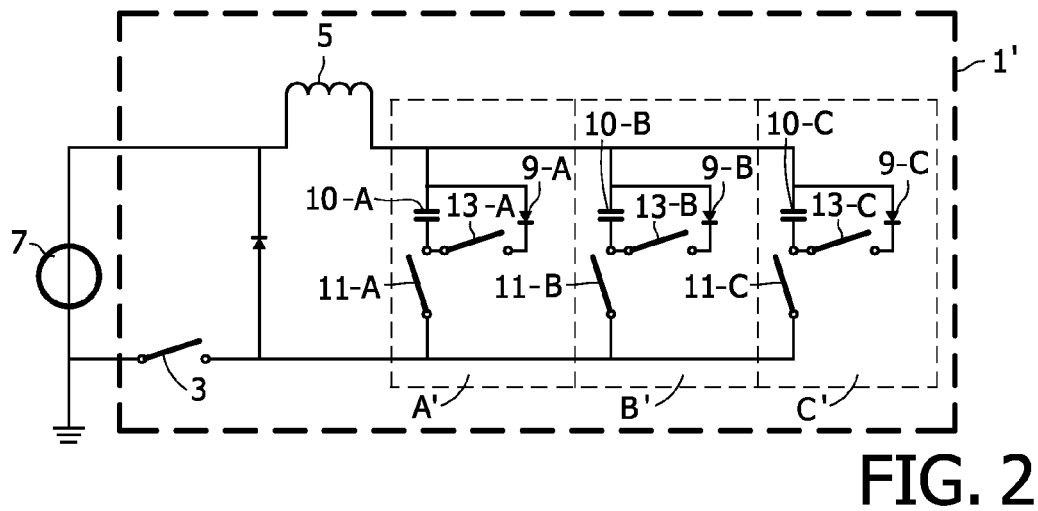
FIG. 2 schematically shows a driver circuit arrangement according to the present invention.

FIG. 2 schematically shows a driver circuit arrangement according to the present invention. Similar parts are denoted by the same reference numerals.

The driver circuit arrangement 1' again comprises a connecting switch 3 that connects a power converter 5 to a source 7 of electrical energy. The driver circuit arrangement 1' again comprises 3 subsystems A', B' and C'. Of course, any other plural number of subsystems, such as 2, or 4, 5, etc., is also possible. Note that in particular very large numbers of electrical subsystems are contemplated, such as large numbers of LEDs or pixels in a display. Each subsystem, e.g. subsystem A', comprises an electrical device, an energy storage device, a switch and a subswitch, for example 9-A, 10-A, 11-A and 13-A, respectively. The connecting switch 3 may also be some other means of connecting the driver circuit arrangement 1 to the source of energy 7, such as an electrical plug etc.

The power converter 5 has only been indicated schematically. It may comprise a buck converter, a boost converter, and a combination thereof, etc. It is also possible to provide such a power converter 5 as an external device, such as being a part of the source of electrical energy 7.

The driver circuit arrangement 1' may e.g. function as follows. An external control unit (not shown), which may also be comprised in the driver circuit arrangement, in the form of an IC, may e.g. select the first subsystem A' to be supplied with energy from the source 7. Thereto, the control unit may for example close the switch 11-A, while the other switches, 11-B and 11-C, may either be open or closed. Then, the control unit may further control the subswitch 13-A, for example to be in a closed position. In that case, the device 9-A will be supplied with energy from the source 7, while also the energy storage device 10-A will be supplied with energy. When subsequently the control unit deselects the first subsystem A', e.g. by opening the switch 11-A, the energy storage device 10-A may still provide energy to the electrical device 9-A if the subswitch 13-A is closed. The control unit (not shown) may still control energy flow to the electrical device 9-A by controlling the position of the subswitch 13-A. This may be performed in e.g. the pulse width modulation mode, or by simply keeping the subswitch 13-A closed until a certain amount of energy has flown from the energy storage device 10-A.

After deselecting the first subsystem A', another subsystem, B' or C', may be selected. Alternatively, the selection of A', B' and C' may be completely independent of each other.

A big advantage of the driver circuit arrangement 1' according to the present invention is that the control unit may still control the energy flow to the electrical devices, even when the main flow of energy from the source 7 of electrical energy to the electrical devices 9-A has been interrupted by the switch 11-A. The present invention has particular advantages when the electrical device 9-A, B, C, is a more complex device then the simple devices shown in FIG. 2. All this will be discussed in the following embodiment.

Figure 3:
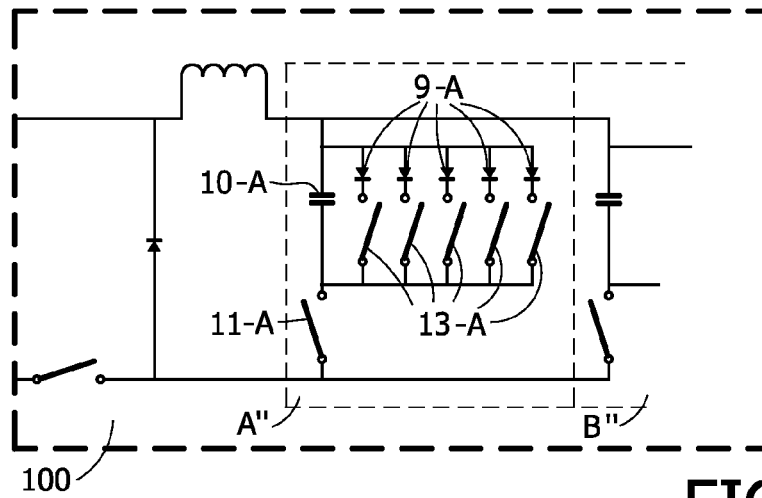
FIG. 3 diagrammatically shows a driver circuit arrangement 100 according to another embodiment of the present invention.

FIG. 3 diagrammatically shows a driver circuit arrangement 100 according to another embodiment of the present invention. The arrangement 100 comprises a subsystem A" comprising a large number of LEDs 9-A, an energy storage device 110-A, a switch 11-A and a large number of subswitches 13-A. Note that the circuit arrangement 100 comprises more subsystems B", . . . , which have not been indicated any further.

The subsystem A" comprises a single capacitor 10-A and five LEDs, each with a separate subswitch 13-A. In this embodiment, each of the electrical "subdevices" or LEDs 9-A may be controlled separately, by a control unit (not shown here). This allows optimum control over the total performance of the circuit arrangement 100. It is even possible to provide each electrical device 9-A with its own energy storage device 10-A. It is furthermore possible to make the circuit arrangement of the subsystem A" even more complex by providing a combination of series and parallel connections of electrical devices, or even more complexly connected devices 9-A.

As indicated above, the electrical devices 9-A may for example be LEDs, although any other electrical device, such as lamps, LCD pixels, traffic lights, etc., are also possible. Taking for example five differently colored LEDs that in combination are able to emit white light, each subsystem A", B", etc. may form a single light emitting element of a display or the like. In that case, when building an image on the display, each light emitting element, or subsystem, may be controlled subsequently, by correspondingly switching the switches 11-A, 11-B etc. When in the meantime, i.e. while a particular subsystem is not selected, a setting changes, such as a desired overall brightness of the display, the setting of the devices 9-A in the subsystem A" may still be changed by accordingly controlling the subswitches 13-A. For example, if a user of a display desires a lower brightness, the control unit (not shown) may decrease the pulse width with which the subswitches 30-A are closed, or may alternatively open those subswitches 13-A. It goes without saying that a similar control is exerted over the corresponding subswitches etc. in subsystem B", etc.

The invention claimed is:

1. A driver circuit arrangement (1; 1'; 100), comprising
   a connection (3) to a source (7) of electrical energy, and
   a plurality of individually switchable electrical subsystems (A, B, C; A', B', C'; A", B"), each subsystem comprising
      a switch (11-A, 11-B, 11-C) for controlling a flow of energy from the source (7) of electrical energy to said subsystem (A', B', C'; A", B"),
      an electrical device (9-A, 9-B, 9-C), and
      an energy storage device (10-A, 10-B, 10-C) for storing energy, characterized in that each subsystem (A', B', C'; A", B") comprises a subswitch (13-A, 13-B, 13-C), constructed and arranged to control a flow of stored energy from the energy storage device (10-A, 10-B, 10-C) to the electrical device (9-A, 9-B, 9-C).

2. The driver circuit arrangement of claim 1, further comprising a power converter (5).

3. The driver circuit arrangement of claim 1, further comprising a switch controller for controlling the switches (11-A, 11-B, 11-C).

4. The driver circuit arrangement of claim 1, further comprising a subswitch controller for controlling the subswitches (13-A, 13-B, 13-C).

5. The driver circuit arrangement of claim 1, wherein the energy storage device (10-A, 10-B, 10-C) comprises a capacitor.

6. The driver circuit arrangement of claim 1, wherein at least one subsystem (A', B', C'; A", B") comprises a plurality of electrical devices (9-A) connected in parallel and/or in series.

7. The driver circuit arrangement of claim 6, wherein, in at least one subsystem (A', B', C'; A", B"), each electrical device (9A) is individually switchable and individually energizable.

8. The driver circuit arrangement of claim 1, wherein at least one electrical device (9-A, 9-B, 9-C) comprises a LED.

* * * * *